United States Patent
Kim

(10) Patent No.: US 11,625,259 B2
(45) Date of Patent: *Apr. 11, 2023

(54) SYSTEMS AND METHODS FOR VIRTUAL SERVER RESOURCE USAGE METRIC EVALUATION AND PERFORMANCE TRACKING

(71) Applicant: Coupang Corp., Seoul (KR)

(72) Inventor: Tae Kyung Kim, Seoul (KR)

(73) Assignee: Coupang Corp., Seoul (KR)

( * ) Notice: Subject to any disclaimer, the term of this patent is extended or adjusted under 35 U.S.C. 154(b) by 277 days.

This patent is subject to a terminal disclaimer.

(21) Appl. No.: 17/020,088

(22) Filed: Sep. 14, 2020

(65) Prior Publication Data

US 2021/0240510 A1 Aug. 5, 2021

Related U.S. Application Data

(63) Continuation of application No. 16/777,709, filed on Jan. 30, 2020, now Pat. No. 10,817,328.

(51) Int. Cl.
  *G06F 9/46* (2006.01)
  *G06F 9/455* (2018.01)
  (Continued)

(52) U.S. Cl.
  CPC ........ *G06F 9/45558* (2013.01); *G06F 9/5077* (2013.01); *H04L 43/045* (2013.01); *H04L 43/08* (2013.01); *G06F 2009/45591* (2013.01)

(58) Field of Classification Search
  CPC .............. G06F 9/45558; G06F 9/5077; G06F 2009/45591; H04L 43/045; H04L 43/08
  See application file for complete search history.

(56) References Cited

U.S. PATENT DOCUMENTS 10,097,627 B1 * 10/2018 Gafton ................ G06F 9/45558
2012/0089980 A1   4/2012 Sharp et al.
(Continued)

FOREIGN PATENT DOCUMENTS

CN    102799512 A    11/2012
CN    106708238 A    5/2017
(Continued)

OTHER PUBLICATIONS

Mitch Garnaat, GitHub Repository for Skew Programming Library, https://github.com/scopely-devops/skew, Mar. 31, 2019 (4 pages).
(Continued)

*Primary Examiner* — Wissam Rashid
(74) *Attorney, Agent, or Firm* — Finnegan, Henderson, Farabow, Garrett & Dunner, LLP

(57) ABSTRACT

Methods and systems for resource usage metric grading are disclosed. In one embodiment, an exemplary method comprises receiving a request to assign a first role to at least one virtual server; configuring the virtual server to associate the first role with a first resource of the virtual server; modifying a database to include an identifier associated with the virtual server and an identifier of the first role assigned to the virtual server; receiving, from the virtual server, indications of resource usage for a plurality of roles; calculating an efficiency metric associated with the first role, the efficiency based on resource usage associated with the first role and resource usage associated with the plurality of roles; modifying a user interface element for presentation on a web page to include the calculated efficiency metric for the first role; receiving a request from a user; and delivering the web page.

19 Claims, 7 Drawing Sheets

(51) Int. Cl.
    *G06F 9/50*       (2006.01)
    *H04L 43/045*   (2022.01)
    *H04L 43/08*    (2022.01)

(56) References Cited

U.S. PATENT DOCUMENTS

| | | |
|---|---|---|
| 2012/0284713 A1 | 11/2012 | Ostermeyer et al. |
| 2014/0351613 A1 | 11/2014 | Kansal et al. |
| 2015/0082318 A1 | 3/2015 | Kruglick |
| 2015/0149424 A1 | 5/2015 | Margalit et al. |
| 2015/0288592 A1* | 10/2015 | Baughman .............. H04L 43/08 709/224 |
| 2015/0309828 A1 | 10/2015 | Shaik et al. |
| 2015/0378604 A1 | 12/2015 | Kawakami et al. |

FOREIGN PATENT DOCUMENTS

| | | |
|---|---|---|
| CN | 107577533 A | 1/2018 |
| KR | 10-2015-0092492 A | 8/2015 |

OTHER PUBLICATIONS

International Search Report and Written Opinion in Application No. PCT/IB2020/060910 dated Feb. 22, 2021 (8 pages).
Examination Notice of Standard Patent of Hong Kong Application No. 22020022247.3, dated Mar. 7, 2022.

\* cited by examiner

|  |  | Sales | | Research & Development |
|---|---|---|---|---|
|  |  | Web Hosting (506) | Email Archives (508) | Neural Network Training (510) |
| Virtual Server A (512) | Processor A | ✓ |  | ✓ |
|  | Storage A | ✓ | ✓ |  |
|  | Connectivity A |  |  |  |
| Virtual Server B (514) | Processor B |  |  | ✓ |
|  | Storage B |  | ✓ |  |
|  | Connectivity B | ✓ |  |  |
| Virtual Server C (516) | Processor C | ✓ |  | ✓ |
|  | Storage C | ✓ | ✓ |  |
|  | Connectivity C |  |  |  |

FIG. 5

|  |  | Sales | | Research & Development |
|---|---|---|---|---|
|  |  | Web Hosting | Email Archives | Neural Network Training |
| Virtual Server A (512) | CPU Efficiency A | 50 |  | 32 |
|  | Storage Efficiency A | 100 | 57 |  |
|  | Network Efficiency A |  |  |  |
| Virtual Server B (514) | CPU Efficiency B |  |  | 85 |
|  | Storage Efficiency B |  | 83 |  |
|  | Network Efficiency B |  |  |  |
| Virtual Server C (516) | CPU Efficiency C | 75 |  | 91 |
|  | Storage Efficiency C | 80 | 21 |  |
|  | Network Efficiency C |  |  |  |
| | Grades (CPU/Storage/Network/Total) (702) | B/A/X/B | X/C/X/C | B/X/X/B |

FIG. 7

SYSTEMS AND METHODS FOR VIRTUAL SERVER RESOURCE USAGE METRIC EVALUATION AND PERFORMANCE TRACKING

CROSS-REFERENCE TO RELATED APPLICATIONS

This application is a continuation of, and claims priority under 35 U.S.C. § 119 to U.S. patent application Ser. No. 16/777,709, filed on Jan. 30, 2020. The disclosures of the above-referenced application is expressly incorporated herein by reference in its entirety.

TECHNICAL FIELD

The present disclosure generally relates to computerized systems and methods for tracking efficiency of virtual servers using a configuration management database. In particular, embodiments of the present disclosure relate to a system that receives a request to assign a processing, storage, or communication role to a virtual server. The system configures the virtual server to associate the role with a resource of the virtual server and determines virtual server efficiencies associated with the role. The efficiencies are graded and presented on a web page. In this way, a single configuration management database may quickly track efficiencies of multiple roles which may be distributed among many different resources or virtual servers.

BACKGROUND

Proliferation of virtual servers has broadened access to large computing resources at low costs. Various corporations provide virtual server resources, also known as cloud computing. Further, companies, universities, and government organizations utilize virtual servers to host websites, perform complex computer simulations, and store large databases, among other services. Virtual servers provide secure, reliable, and scalable computational resources to clients, enabling clients to focus on creating products rather than maintaining server capability.

However, complex organizations consuming large amounts of virtual server resources often have difficulty tracking virtual server performance or efficiency. For instance, a large company may have many different operations, each requiring different virtual server resources. A management department may require storage on a virtual server, while research and development require processing for computational modeling, and a sales department may need a virtual server to host a web site.

Further, many different operations within an organization consume the same resources. A customer service chat and an online store may both require a virtual server hosting a website. Alternatively, a computer science department at a university may require processing power for various computational studies, such as training a machine learning algorithm and performing Monte Carlo simulations. However, virtual server providers often only report the aggregated usage or each resource, or the total usage of an individual virtual server. This makes it difficult for complex organizations to measure the efficiency of employed virtual servers, both as an absolute metric and relative to other virtual servers. An organization may be unable to determine which virtual server is performing poorly, and inadvertently continue to use a virtual server with poor performance, rather than shifting resource usage to better performing virtual servers. This could lead to wasted organizational resources, requiring greater time and money to accomplish a role on a virtual server than a more efficient organization of virtual server resources and roles.

Accordingly, there is a need for systems and methods to grade virtual server resource usage metrics within an organization that requires virtual server resources.

SUMMARY

One aspect of the present disclosure is directed to a computer-implemented system for resource usage metric grading. The system comprises a memory storing instructions and at least one processor configured to execute the instructions to: receive a request to assign a first role to at least one virtual server; configure the virtual server to associate the first role with a first resource of the virtual server; modify a database to include an identifier associated with the virtual server and an identifier of the first role assigned to the virtual server; receive, from the virtual server, indications of resource usage for a plurality of roles; calculate an efficiency metric associated with the first role, the efficiency based on resource usage associated with the first role and resource usage associated with the plurality of roles; modify a user interface element for presentation on a web page to include the calculated efficiency metric for the first role; receive a request for the web page from a user; and deliver the web page to a user interface for display.

Another aspect of the present disclosure is directed to a computer-implemented method for resource usage metric grading. The method includes the steps of: receiving a request to assign a first role to at least one virtual server; configuring the virtual server to associate the first role with a first resource of the virtual server; modifying a database to include an identifier associated with the virtual server and an identifier of the first role assigned to the virtual server; receiving, from the virtual server, indications of resource usage for a plurality of roles; calculating an efficiency metric associated with the first role, the efficiency based on resource usage associated with the first role and resource usage associated with the plurality of roles; modifying a user interface element for presentation on a web page to include the calculated efficiency metric for the first role; receiving a request for the web page from a user; and delivering the web page to a user interface for display.

Another aspect of the present disclosure is directed to a computer-implemented system for resource usage tracking. The system comprises a memory storing instructions and at least one processor configured to execute the instructions to: receive a processing resource request from a first client; associate the request with a first role; determine a virtual server capable of providing the resource; configure the virtual server to associate the first role with a first resource of the virtual server; modify a database to include an identifier associated with the virtual server and an identifier of the first role assigned to the virtual server; receive, from the virtual server, indications of storage usage for a plurality of roles; calculate an efficiency metric associated with the first role, the efficiency based on storage usage associated with the first role and storage usage associated with the plurality of roles; determine a statistical distribution of storage usage for the plurality of roles; assign a grade to the first role based on a percentile of the statistical distribution containing storage usage of the first role; modify a user interface element for presentation on a web page to include the grade for the first role; receive a request for the web page from a user; and deliver the web page to a user interface for display.

Other systems, methods, and computer-readable media are also discussed herein.

BRIEF DESCRIPTION OF THE DRAWINGS

FIG. 5 illustrates associations of roles and resources of multiple virtual servers, consistent with the disclosed embodiments.

FIG. 7 illustrates an exemplary display of virtual server grades, consistent with the disclosed embodiments.

DETAILED DESCRIPTION

Figure 1:
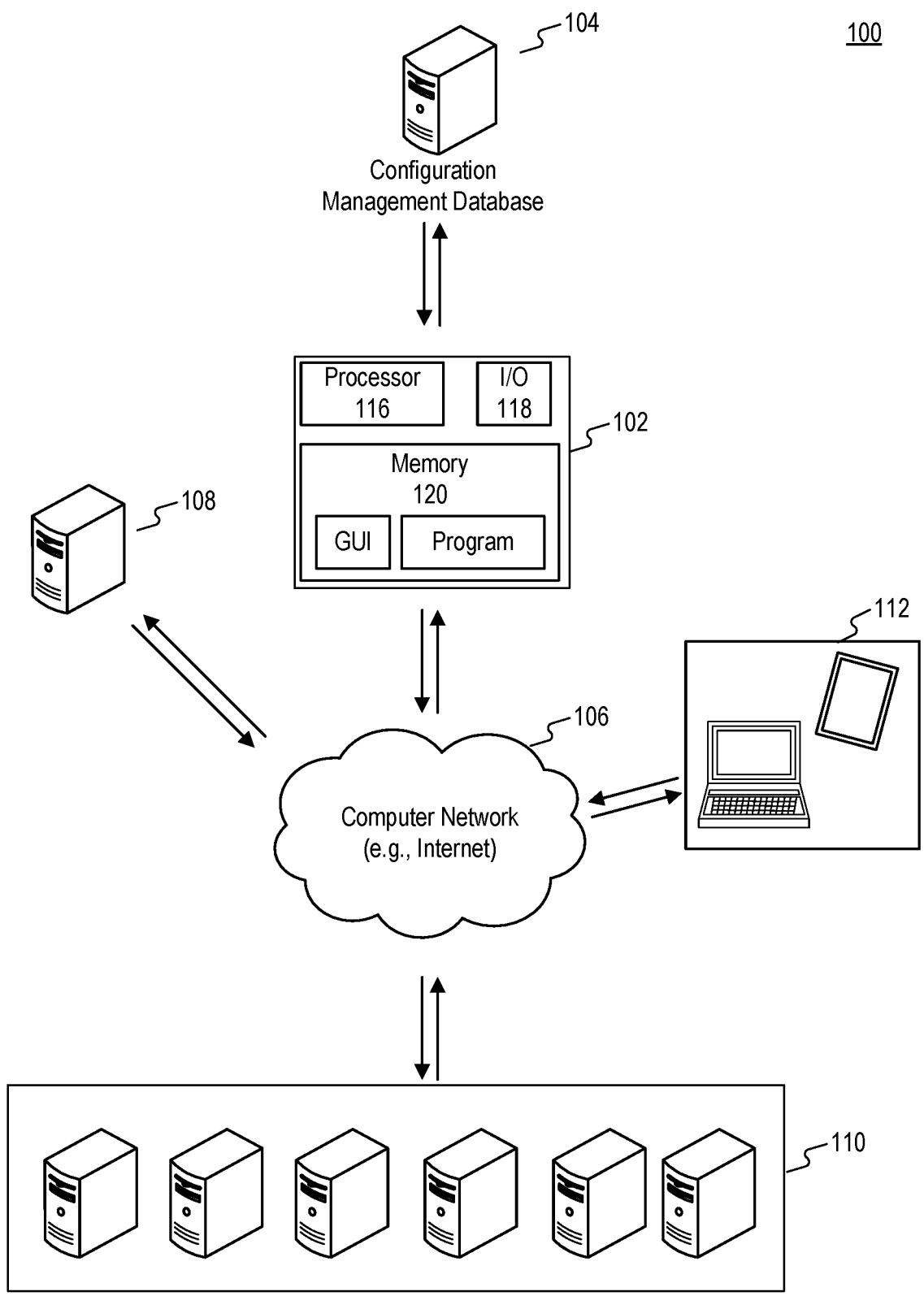
FIG. 1 illustrates a network including a client and virtual servers, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods for virtual server resource usage metric grading.

FIG. 1 shows a network 100 including a virtual server resource usage metric grading system 102. System 102 includes at least one processor 116, an input/output (I/O) device that allows data to be transmitted 118, and at least one memory 120. The memory 120 stores a program for operating the IP categorization module. The memory 120 may also store instructions for a graphical user interface (GUI).

Furthermore, processor 116 may be a generic or specific electronic device capable of manipulating or processing information. For example, the processor may include any combination of any number of a central processing unit (or "CPU"), a graphics processing unit (or "GPU"), an optical processor, a programmable logic controllers, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), and any type of circuit capable of data processing. The processor may also be a virtual processor that includes one or more processors distributed across multiple machines or devices coupled via a network.

Additionally, the memory 120 may be a generic or specific electronic device capable of storing codes and data accessible by the processor (e.g., via a bus, not shown). For example, the memory may include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or any type of storage device. The codes may include an operating system (OS) and one or more application programs (or "apps") for specific tasks. The memory may also be a virtual memory that includes one or more memories distributed across multiple machines or devices coupled via a network.

System 102 is connected to a configuration management database (CMDB) 104. CMDB 104 may comprise a processor, I/O device, and memory. The memory of CMDB 104 may store configuration files for initializing virtual servers, such as necessary resource allocations including processor speeds and memory, stored variables, connection parameters including ports and IP addresses. CMDB 104 also may store user requests corresponding to roles for virtual server resources. In some embodiments, system 102 may concurrently operate as CMDB 104.

System 102 is connected to a computer network 106. For example, computer network 106 may include any combination of any number of the Internet, an Intranet, a Local-Area Network (LAN), a Wide-Area Network (WAN), a Metropolitan-Area Network (MAN), a virtual private network (VPN), a wireless network (e.g., compliant with the IEEE 802.11a/b/g/n), a wired network, a leased line, a cellular data network, and a network using Bluetooth connections, infrared connections, or Near-Field Communication (NFC) connections.

System 102 is further connected, either directly or via computer network 106, to client device 108. Client device 108 may be a laptop, standalone computer, mobile phone, and the like. A user may send virtual server resource requests through client device 108 to system 102. In some embodiments, system 102 may include client device 108 so that a single unit receives user requests and creates and stores configuration files. Alternatively, system 102 and client device 108 may be directly connected such that information exchanged between client device 108 and system 102 need not pass over computer network 106.

Additionally, system 102 communicates with virtual server provider 110. Provider 110 may, for instance, be a service operating a plurality of servers or general purpose computers, such as a server farm, which are available for rent or purchase. In some embodiments, provider 110 may charge a user for processing time, processor capability, storage, or connectivity, such as bandwidth. Provider 110 may also charge users a set baseline for connection to virtual servers, regardless of level of use, as a retainer to guarantee future access. Provider 110 may have servers and computers of varying capabilities, and may sell systems to users while charging maintenance fees. Other arrangements selling virtual server resources by provider 110 are possible as well.

In some embodiments, customer devices 112 may connect to services hosted by virtual servers of provider 110 via network 106. For example, a company may use servers operated by provider 110 to host an e-commerce website. Customer devices 112 may then connect to the e-commerce website via network 106. In this way, customers may access a company's website without directly accessing computers owned by the company, and instead interact with virtual servers operated by provider 110. This may provide a company with the convenience of not having organic employees to operate servers, and reduce costs by only paying for the amount of computing power the company needs. Alternatively, customer devices 112 may be research collaborators, for instance, who are able to share common data stored by the virtual servers of provider 110 or computing power without operating large server farms.

Figure 2:
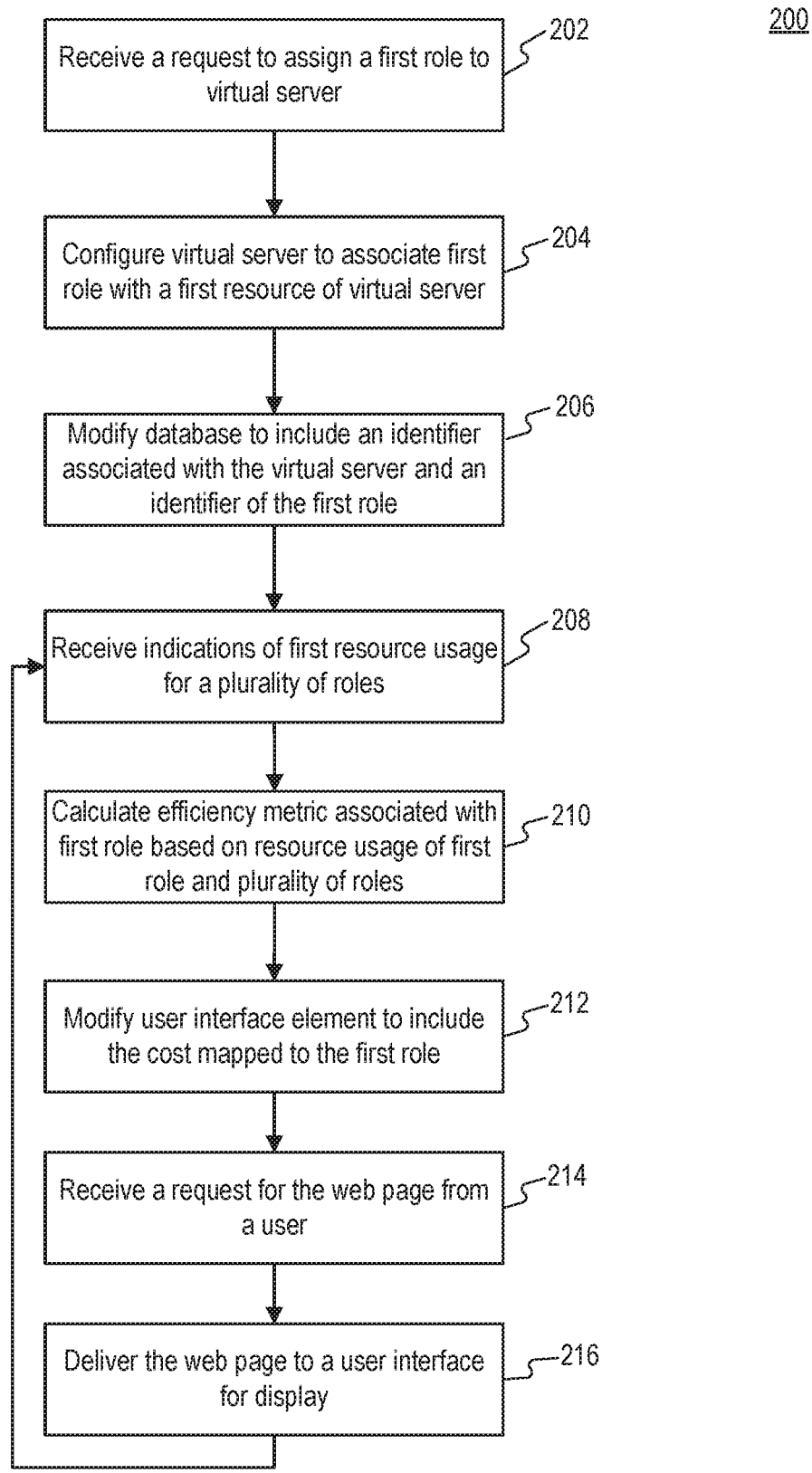
FIG. 2 is a flowchart of a resource usage metric grading process, consistent with the disclosed embodiments.

FIG. 2 shows steps of a resource usage tracking process 200. System 102 may perform resource usage tracking process 200. For example, instructions for performing the resource usage tracking process 200 may be stored on the memory 120 and implemented by the processor of system 102. The resource usage tracking process 200 includes the following steps.

At step 202, system 102 receives a request to assign a first role to at least one virtual server. The request may originate from client device 108, either automatically by another process or by a user entering a request via client device 108. The first role may be, for instance, web site hosting, simulation process, or data storage. The request may specify a particular virtual server. Additionally, the request may also contain requirements such as processing time, processing power, storage, or bandwidth, for instance. Alternative, a user may initialize an operation using client device 108, and system 102 may determine the resources needed to accomplish the operation.

At step 204, system 102 configures the virtual server to associate the first role with a first resource of the virtual server. Associating a role with a resource may require system 102 (or the virtual server) to retrieve data, such as IP addresses and ports, from CMDB 104. Alternatively, software, code, initialization data or parameters, or digital assets may be copied from CMDB 104 or another storage and provided to the virtual server. System 102 may determine which resources are needed for the virtual server. The virtual server, on the other hand, may determine the needed resources based on the role contained in the request.

At step 206, system 102 modifies a database to include an identifier associated with the virtual server and an identifier of the first role assigned to the virtual server. The database may be, for instance, CMDB 104, memory 120, or stored on a virtual server. The database may record the virtual server identifier and the first role identifier in a SQL database, for example. Provider 110 may provide a unique identifier for the virtual server hosting the resource, such as an alphanumeric code, MAC address, IP address, or geophysical location including, for instance, a server warehouse location and server stack location within the warehouse. The virtual server identifier may also specify the resource of the virtual server performing the role.

At step 208, system 102 receives, from the virtual server, indications of resource usage for a plurality of roles. The indications may be power consumption, processing duration, processor operations, bandwidth usage, storage, and the like. Further, the indications may include a cost per unit, such as cents per hour, cents per execution, or cents per floating point operation. The indications may comprise a cost per unit per time, such as cents per terabyte per month. Alternatively, cost per unit may be obtained separately from the indications of first resource usage. In some embodiments, the indications may further include information identifying the specific virtual server or account consuming the virtual server resource. The indications may be provided by an Application Programming Interface (API) operated by provider 110 or directly by the virtual server. Further, the plurality of roles may all be associated with a single organization. For example, an organization may have a large number of roles using various combinations of virtual server resources, and system 102 may receive indications of resource usage for the plurality of resources serving the plurality of roles. In some embodiments, system 102 may retrieve or receive indications of resource usage for roles outside of the organization, such as publicly available metrics of virtual server resource performance. For instance, system 102 may make repeated API requests using known permutations of virtual server identifiers to establish a sample of virtual server resource performance metrics.

Further, system 102 may map the resource usage to respective roles. For instance, system 102 correlate virtual server identifiers provided with the indications to virtual server identifiers stored in the database. Determining the virtual server identifier stored in the database will provide the first role associated with the virtual server at step 204, allowing system 102 to map the first resource cost to the first role.

In some embodiments, received indications do not include virtual server identifiers. System 102 may then determine virtual server identifiers by matching resource usage to other information from provider 110. For example, received indications may only contain a list of usage, such as 23 terabytes, 29 terabytes, 51 terabytes, and 81 terabytes of storage for a month. System 102 may access a provider website in an additional step to determine, for instance, which virtual server stored 23 terabytes during the month, thereby obtaining a virtual server identifier to enable mapping to the first role.

Furthermore, in some situations, system 102 may receive, from the virtual sever, indications of second resource usage. After comparing the resource usage to the database or other resources, such as provider information, system 102 may determine that the second resource is not associated with any role and terminate access to the second resource. For example, system 102 may receive indication of five hours of processing time costing $0.20 and no virtual server identifier. After analyzing the provider information, system 102 may determine that the virtual server responsible for the $0.20 charge was not attached to any role in the database and automatically terminate access to the server. As an example, system 102 may receive an indication of 2 terabytes of storage for a virtual server with identifier A623g.6. System 102 may search the database for a server having identifier A623g.6 but find no associated role, indicating, for instance, that a user had ceased the role and no longer requires the resource. System 102 may then terminate access to the second resource automatically. In some embodiments, system 102 may automatically reassign a different role to the virtual server resource having no associated role, or flag the unassociated resource for reassignment by a user.

At step 210, system 102 calculates an efficiency metric associated with the first role, the efficiency metric based on resource usage associated with the first role and resource usage associated with the plurality of roles. The efficiency metric may reflect a relative performance of the first role in comparison to the performance of the other roles, or virtual server resource performance in comparison to similar virtual server resource performances across a plurality of roles. In some embodiments, system 102 may calculate individual efficiency metrics for each of the roles, for instance, determining an average processor speed for the virtual server of each role. Efficiency metrics may reflect the hardware performance of the virtual server resource, such that system 102 determines different efficiency metric values for the same role being performed on different virtual servers. Alternatively, efficiency metric may reflect the individual role performance, such that system 102 calculates the same or similar values of an efficiency metric for the same role regardless of virtual server identifier. This may be useful for organizations to determine poorly designed roles, such as a role with software flaws that cause memory leakage or improperly implement parallel processing, misapplication of networking standards, or poorly designed storage configuration.

Further, performance may be measured by cost of the resource, and the efficiency metric may reflect a cost efficiency. Additionally, system 102 may calculate different efficiency metrics for different corresponding virtual server resources. For example, system 102 may calculate at least one of a processor efficiency metric, a memory efficiency metric, or a network efficiency metric. If a role utilizes multiple resource types, system 102 may further determine a total efficiency of a role. For instance, system 102 may calculate the efficiency metric based on a combination of the processor efficiency metric, the memory efficiency metric, and the network efficiency metric, such as a weighted average that reflects management preferences for efficiency or resource cost.

At step 212, system 102 modifies a user interface element for presentation on a web page to include the calculated efficiency metric for the first role. Additionally, at step 214, system 102 receives a request for the web page from a user, and, at step 216, delivers the web page to a user interface for display. Various modes of presentation may be used to display the efficiency metric, including trend lines or text display. Additionally, system 102 may complete additional analysis on the calculated efficiency metric, such as identifying deviations from historical values. In some embodiments, system 102 may process a plurality of roles, and modify user interface elements for the plurality of roles, as well as providing analysis of the roles in comparison to each other, such as flagging inefficient or efficient roles. Further, system 102 may combine efficiency metric values for multiple resource types within a single role, thereby providing, for example, a total processor efficiency metric value for a neural network training role.

System 102 may further determine overall efficiency for a plurality of roles corresponding to a group. For example, a company may have multiple groups, such as website operation, customer service, deliveries, research and development, and management. Each group may be responsible for multiple roles. For instance, the research and development department may operate multiple modeling roles having a variety of efficiency metric values. System 102 may combine the efficiency metric values corresponding to a group to create an aggregate group efficiency. This may be repeated for a plurality of groups within an organization, allowing managers to determine efficient and inefficient groups. System 102 may also aggregate efficiency metrics by resource for each group, such that each group has an aggregate processor efficiency metric, for example. This could help managers determine a group that is using poor programming methods and provide additional training or guidance to improve overall performance.

System 102 may also map efficiency metrics to individual clients. For example, a user may submit a resource request using a first client having an identifier, such as MAC address, IP address, computer name, or user login information. System 102 may associate the first client with the first resource, and modify a user interface element for presentation on a web page to include the efficiency mapped to the first client. This may allow an organization to track resource usage for individual users or clients, aiding identification of clients that are unproductive, for example.

After any of steps 212 through 216, system 102 may return to step 208 and receive additional indications and continue tracking resource usage. The period for the cycle may be time-based, such as once per hour, or event-based, such as on demand or once a resource usage passes a threshold.

Figure 3:
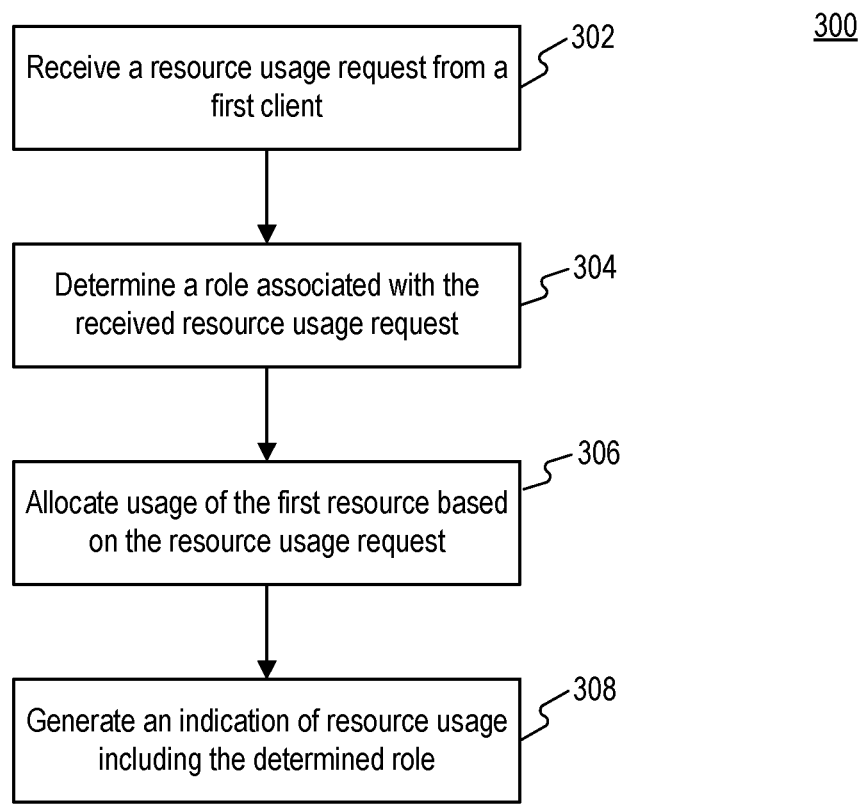
FIG. 3 is a flowchart of a resource usage allocation and tracking process, consistent with the disclosed embodiments.

FIG. 3 shows steps of a resource usage allocation and tracking process 300. System 102 may configure the virtual server to perform resource usage tracking process 300. The resource usage tracking process 300 includes the following steps.

At step 302, the virtual server receives a resource usage request from a first client. A user may use client device 108 to initiate the request. A user may initiate a generalized request for a resource, such as indicating that storage is needed. A user may also provide a detailed request for an operation, a request to modify data in a database, a request to store data, or a request to transfer data. Requests to transfer data may include, for instance, transferring data between databases or providing a website to a consumer, and may be measured in bandwidth usage. Client device 108 may communicate directly with the virtual server to alter or initiate usage request, or may communicate with the virtual server through system 102.

At step 304, the virtual server determines a role associated with the received resource usage request. The virtual server may determine the role based on the identity of the first client. For example, the first client may have a MAC address or IP address associated with a particular department having a known role. A user may also indicate the role when making the request. In some embodiments, system 102 may determine the role based on similarities between the resource usage request and the resource usage requests of other roles, and provide the role to the virtual server.

At step 306, the virtual server allocates usage of the first resource based on the resource usage request. The first resource may include, for example, processing, storage, or connectivity, or a combination thereof, according to the resource usage request. The virtual server may allocate an amount of time or storage based on the resource usage request. In some embodiments, the virtual server may reserve the time or storage exclusively for the resource usage request. Alternatively, the virtual server may accommodate multiple roles to the same resource on an as-needed basis. The virtual server may further be configured to automatically transfer a role to a different virtual server if the first virtual server's efficiency metric value drops below a threshold. The virtual server may, for instance, assemble a configuration file containing communication and processor settings, as well as any environmental variables, obtain an identifier of a recipient virtual server from system 102, and transfer the configuration file to the recipient virtual server. Alternatively, the virtual server may transfer the configuration file to system 102 so that system 102 or a user may configure a new virtual server.

At step 308, the virtual server generates an indication of resource usage, the generated indication including the determined role. The virtual server may be configured by system 102 to generate the indication, for instance, by including the indication in a program that the virtual server runs. The indication may be provided automatically to system 102, for instance, via email, or on demand in response to a request by system 102, for instance, via an API. Further, the virtual server may be configured to pre-format the indication of resource usage for quicker processing by system 102.

Figure 4:
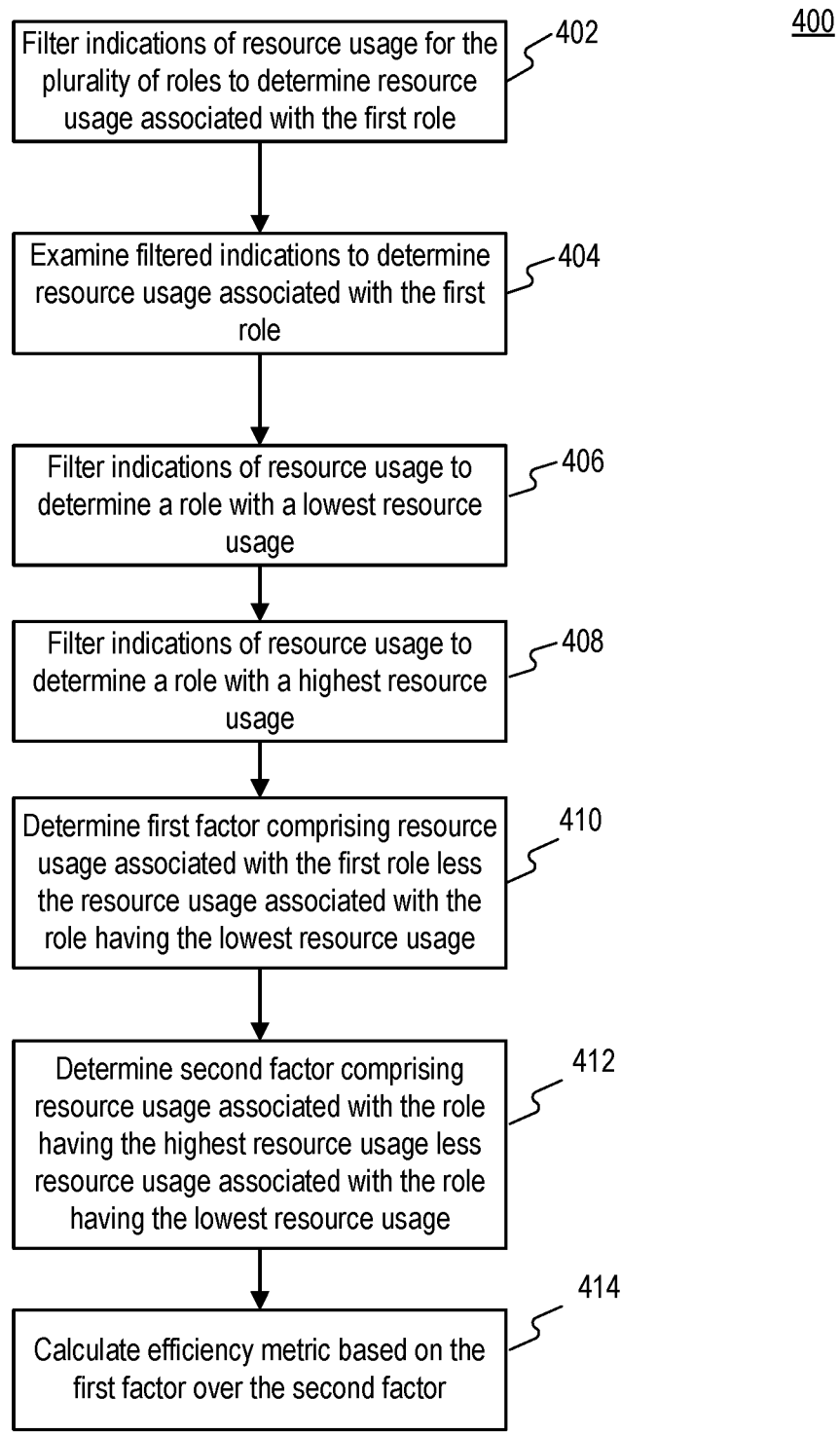
FIG. 4 is a flowchart of a resource usage metric calculation process, consistent with the disclosed embodiments.

FIG. 4 shows steps of an efficiency metric calculation process 400. System 102 may perform process 400 to determine efficiency metrics.

Process 400 may begin with step 402. In step 402, system 102 filters the received indications of resource usage for the plurality of roles to determine resource usage associated with the first role. System 102 may filter received indications by virtual server identifier, resource, or associated role, for example. At step 404, system 102 examines the filtered indications to determine resource usage associated with the first role. System 102 may aggregate usage over a period of time, virtual servers, or providers, for instance, to determine the total resource usage associated with the first role. In some embodiments, the indications may be incorporated into various data structures to facilitate filtering and aggregating. For instance, the data may be converted for insertion into a SQL database prior to process 400.

At step 406, system 102 filters the received indications of resource usage to determine a role with a lowest resource usage, and, at step 408, filters the received indications of resource usage to determine a role with a highest resource usage. Steps 406 and 408 may further include an aggregation step to determine total usage over a period of time for each of the roles to determine the overall lowest and highest resource using roles.

At step 410, system 102 determines a first factor comprising the resource usage associated with the first role less the resource usage associated with the role having the lowest resource usage. In other words, system 102 determines a difference between the resource usage of the first role and the lowest resource usage among all of the roles. Further, at step 412, system 102 determines a second factor comprising the resource usage associated with the role having the highest resource usage less the resource usage associated with the role having the lowest resource usage. In this manner, system 102 determines the range of resource usage for the roles being analyzed.

At step 414, system 102 calculates an efficiency metric based on the first factor over the second factor. For example, the highest resource using role may have an efficiency metric of 1, and the lowest resource using role may have an efficiency metric of 0. The remaining roles may then have an efficiency metric ranging from 0 to 1. However, this example is provided for illustration, and efficiency metrics may have any range, such as 0 to 100. Additionally, multiple roles may have the same efficiency metric value.

In some embodiments, system 102 may use variations of steps 410 through 414 to further analyze or normalize indications of resource usage as part of calculating efficiency metrics. Additionally, different variations may be used for different resources. For example, system 102 may determine a processor efficiency metric reflecting the average CPU usage per week. System 102 may determine a first factor based on the natural logarithm of processor usage associated with the first role less the natural logarithm of processor usage associated with a role having the lowest processor usage. System 102 may also determine a second factor based on the natural logarithm of processor usage associated with a role having the highest resource usage less the natural logarithm of processor usage associated with the role having the lowest processor usage. System 102 may calculate processor efficiency for a role based on the first factor over the second factor. Because the natural logarithm of 0 is undefined, system 102 may omit roles that do not consume a resource, or may add a constant to the usage to avoid mathematical errors.

System 102 may also determine a network efficiency metric reflecting the network ratio of number of bytes processed or transferred per each unit currency for a week. System 102 may determine a first factor based on the natural logarithm of a network ratio associated with the first role less the natural logarithm of a network ratio associated with a role having the lowest processor usage. System 102 may also determine a second factor based on the natural logarithm of processor usage associated with a role having the highest resource usage less the natural logarithm of processor usage associated with the role having the lowest processor usage. System 102 may calculate a processor efficiency metric based on the first factor over the second factor. System 102 may also calculate a memory efficiency metric in a similar manner, based on, for example, average memory usage per week.

FIG. 5 illustrates an exemplary association of roles and resources of multiple virtual servers. FIG. 5 shows two organizations, sales group 502 and research and development group 504. Sales group 502 includes two roles, web hosting role 506 and email archives role 508, while research and development group 504 includes neural network training role 510.

Web hosting role 506 of sales group 502 requires processing, storage, and connectivity. As shown in FIG. 5, these three requirements may be distributed among multiple virtual servers. For instance, virtual server A 512, virtual server B 514, and virtual server C 516 provide a resource to web hosting role 506. In this way, a single role may utilize resources from a plurality of virtual servers. In some instances, a role may use the same resource type of multiple servers, as web hosting role 506 uses storage of virtual server A 512 and storage of virtual server C 516. This may occur if a single virtual server is unable to meet the needs of a role, due to device limitations or competing allocations from other roles.

Further, FIG. 5 illustrates that a virtual server may comprise a plurality of roles, each role being associated with at least on resource of the virtual server. For example, virtual server B 514 provides processing to neural network training role 510, storage to email archives role 508, and connectivity to web hosting role 506. Additionally, an individual resource may be associated with a plurality of roles. For instance, storage of virtual server A 512 is associated with web hosting role 506 and email archives role 508.

In this manner, a virtual server may comprise a plurality of roles, each role being associated with at least one resource of the virtual server. Further, at least one resource of the virtual server may be associated with a plurality of roles. This may allow users to combine multiple roles onto a single virtual server maximizing usage of virtual server resources. Also, a single role may be distributed among many different servers, thereby accessing greater resources than a single server could provide, or selecting particular resources tailored to the role but not available in a single server, such as mixing an expensive high power processor with inexpensive small storage capability. Users may thereby maximize efficiency and reduce cost.

Figure 6:
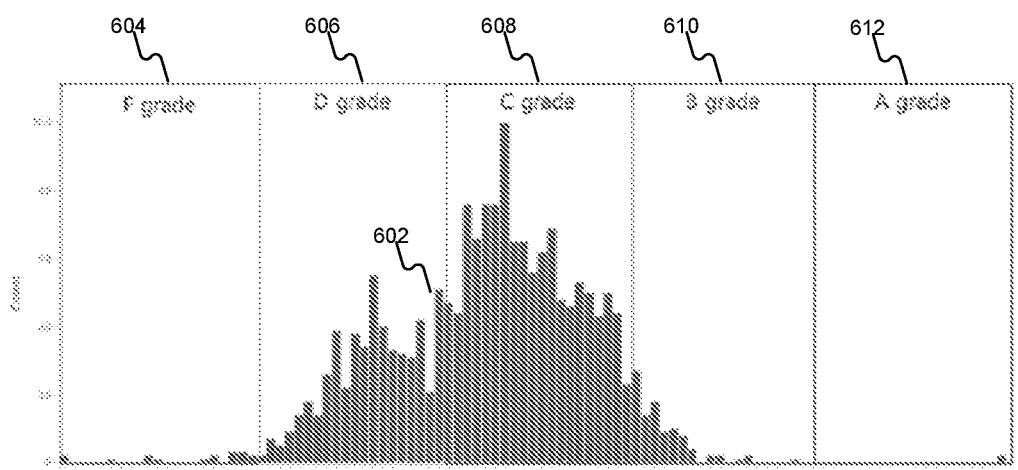
FIG. 6 illustrates an exemplary histogram for grading roles, consistent with the disclosed embodiments.

FIG. 6 illustrates an exemplary histogram for grading roles, consistent with the disclosed embodiments. System 102 may determine a distribution of the efficiency metric for the plurality of roles. For instance, system 102 may create a histogram 602 of the plurality of roles by tallying the number of roles having an efficiency metric in each of a plurality of bins comprising a range of values for efficiency metrics. System 102 may create a histogram on the basis of the total efficiency metric, or any other combination or singular efficiency metric. System 102 may display the histogram on a user interface. Alternatively, system 102 may count the number of roles having an efficiency metric in the plurality of bins and process the count data without creating or displaying a histogram.

Further, system 102 may divide the histogram into a plurality of regions. Region division may be based on percentiles or total number of counts. For example, in FIG. 6, histogram 602 is divided into five ranges 604 through 612. The illustrated ranges are approximately equal, and correspond to divisions of roughly 20% of the total range of efficiency metrics. Further, each range is assigned a letter grade of A, B, C, D, or F. System 102 may therefore assign a grade to the first role based on a percentile of the distribution containing the efficiency metric of the first role. In additional embodiments, grades may comprise other indicators, such as high, medium, and low; other ranges such as top, middle, and bottom third; and other divisions having range boundaries set to include, for instance, one third of the total roles. System 102 may determine a statistical distribution of the efficiency metric for the plurality of roles, for instance, by determining a Gaussian distribution corresponding to the histogram.

System 102 may use grades to control costs and shift roles to better performing virtual servers. Virtual servers having low grades may be reduced in usage or terminated. Further, a virtual server may have a low grade for processing, but high grade for connectivity. A manager may then transfer additional roles requiring connectivity resources to the virtual server, and transfer roles having high processing requirements to virtual servers with better processor grades. Additionally, transfer and termination of roles to and away from virtual servers based on grades may be automated, and triggered if a grade drops or exceeds thresholds, for instance.

FIG. 7 illustrates an exemplary user interface element presented on a web page using the allocation of roles to different virtual servers as shown in FIG. 5 as a basis. System 102 may create a user interface element similar to that shown in FIG. 7 and a histogram as shown in FIG. 6 for display to a user, for example. System 102 may display an efficiency metric value in each cell corresponding to a role and virtual server resource. For example, as shown in FIG. 7, web hosting role 506 uses processing of virtual server A 512. The CPU efficiency of virtual server A 512 when operating web hosting role 506 is determined to be 50. Similarly, storage efficiency of virtual server B 514 when operating email archive role 508 is 83.

Further, system 102 may create grade element 702 to display textually grades associated with each role. Grade element 702 may include an element for each role with an overall grade for each of CPU efficiency, storage efficiency, and network efficiency for the virtual servers utilized for a role. For example, neural network training role 510 utilizes processing from virtual server A 512, virtual server B 514, and virtual server C 516, having respective CPU efficiencies of 32, 85, and 91. Grade element 702 then shows an aggregate CPU efficiency grade of B.

Further, neural network training role 510 does not utilize any storage or connectivity. Grade element 702 may then records an indicator, such as X, for aggregate storage and network efficiency to show that no grade is assigned. Grade element 702 also records a grade for the total efficiency. For neural network training role 510, grade element 702 shows a total efficiency grade of B. In some embodiments, the total grade for a role that uses a subset of measured virtual server resources may omit missing grades or scores when determining the total grade or score. Additionally, other variations of grade element 702 may be displayed, such as a table with a row for each role and a column for each resource, columns for aggregate resource scores and grades, rows for groups within organizations, and the like.

As an exemplary embodiment of the present disclosure a computer-implemented system for resource usage tracking includes a memory storing instructions and at least one processor configured to execute the instructions. The instructions cause the system to receive a processing resource request from a first client and associate the request with a first role. The system then determines a virtual server capable of providing the resource and configures the virtual server to associate the first role with a first resource of the virtual server. The system also modifies a database to include an identifier associated with the virtual server and an identifier of the first role assigned to the virtual server. Further, the system receives, from the virtual server, indications of storage usage for a plurality of roles, and calculates an efficiency metric associated with the first role, the efficiency based on storage usage associated with the first role and storage usage associated with the plurality of roles. The system determines a statistical distribution of storage usage for the plurality of roles; assigns a grade to the first role based on a percentile of the statistical distribution containing storage usage of the first role; and modifies a user interface element for presentation on a web page to include the grade for the first role. The system also receives a request for the web page from a user, and delivers the web page to a user interface for display. In some embodiments, the element may be presented in a standalone program.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A first server having at least one designated role, the server comprising:
a memory storing instructions; and
at least one processor configured to execute the instructions to:
receive a resource usage request for at least one resource from a first client;
determine a role associated with the resource usage request;
determine if an efficiency metric of the server satisfies a threshold;
allocate, based on the resource usage request and when the efficiency metric satisfies the threshold, an amount of the at least one resource;
generate an indication of resource usage, the indication including the determined role; and
provide the indication to a system in response to a request received via an application programming interface (API), wherein the server is configured to automatically transfer the at least one designated role to a second server when the efficiency metric does not satisfy the threshold.

2. The first server of claim 1, wherein the resource usage request comprises a request for an operation, a request to modify data, a request to store data, or a request to transfer data.

3. The first server of claim 1, wherein the role associated with the resource usage request is determined based on an identity of the first client.

4. The first server of claim 3, wherein the identity of the first client comprises a media access control (MAC) address or an Internet Protocol (IP) address.

5. The first server of claim 1, wherein:
the resource usage request is a first resource usage request; and
the role associated with the resource usage request is determined based on a similarity of the first received resource usage request and a second resource usage request.

6. The first server of claim 1, wherein the at least one resource is a processing resource, a storage resource, or a connectivity resource.

7. The first server of claim 1, wherein automatically transferring the at least one designated role to the second server comprises:
assembling a configuration file containing settings or variables; and
transferring the configuration file to the second server.

8. The first server of claim 1, wherein the at least one processor is further configured to execute an instruction to determine the efficiency metric.

9. The first server of claim 8, wherein determining the efficiency metric comprises:
receiving a plurality of indications of resource usages; and
filtering the plurality of indications to determine a resource usage associated with the determined role.

10. The first server of claim 9, wherein the plurality of indications are incorporated into a data structure.

11. The first server of claim 9, wherein determining the efficiency metric further comprises:
determining a first difference between the resource usage associated with the determined role and a lowest resource usage among the plurality;
determining a second difference between the resource usage associated with a highest resource usage among the plurality and the resource usage associated with the lowest resource usage among the plurality; and
dividing the first difference by the second difference to determine the efficiency metric.

12. The first server of claim 9, wherein determining the efficiency metric further comprises:
determining a first difference between a natural logarithm of the resource usage associated with the determined role and a natural logarithm of a lowest resource usage among the plurality;
determining a second difference between a natural logarithm of the resource usage associated with a highest resource usage among the plurality and the natural logarithm of the resource usage associated with the lowest resource usage among the plurality; and
dividing the first difference by the second difference to determine the efficiency metric.

13. The first server of claim 8, wherein the efficiency metric is determined based on usage statistics aggregated over a period of time.

14. The first server of claim 1, wherein the first server and the second server are virtual servers.

15. A computer-implemented method for transferring roles between servers, the method comprising:
receiving a resource usage request for at least one resource from a first client;
determining a role associated with the resource usage request;
determining if an efficiency metric of the server satisfies a threshold;
allocating, based on the resource usage request and when the efficiency metric satisfies the threshold, an amount of the at least one resource;
generating an indication of resource usage, the indication including the determined role;
providing the indication to a system in response to a request received via an application programming interface (API); and
automatically transferring at least one designated role from a first server to a second server when the efficiency metric does not satisfy the threshold.

16. The computer-implemented method of claim 15, wherein
the role is determined based on an identity of the first client.

17. The computer-implemented method of claim 15 further comprising:
assembling a configuration file containing settings or variables;
obtaining an identifier of the second server; and
transferring the configuration file to the second server.

18. The computer-implemented method of claim 15 further comprising:
determining the efficiency metric by performing steps of:
receiving a plurality of indications of resource usages; and
filtering the plurality of indications to determine a resource usage associated with the determined role.

19. The computer-implemented method of claim 18, wherein the steps further comprise:

determining a first difference between the resource usage associated with the determined role and a lowest resource usage among the plurality;
determining a second difference between the resource usage associated with a highest resource usage among the plurality and the resource usage associated with the lowest resource usage among the plurality; and
dividing the first difference by the second difference to determine the efficiency metric.

* * * * *